No. 848,177. PATENTED MAR. 26, 1907.
C. E. KIMBALL.
TIRE PROTECTOR.
APPLICATION FILED NOV. 14, 1905.
2 SHEETS—SHEET 1.
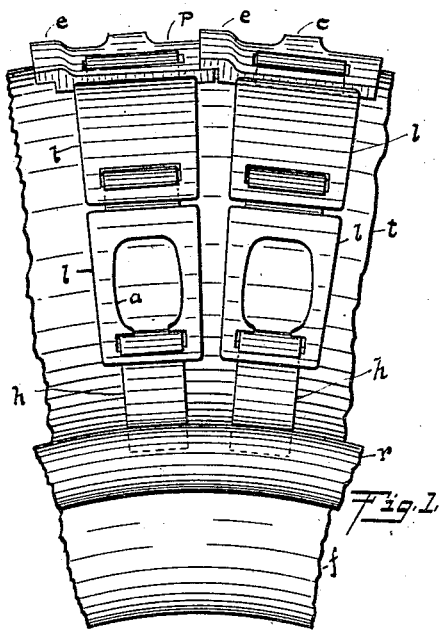
Fig. 1.
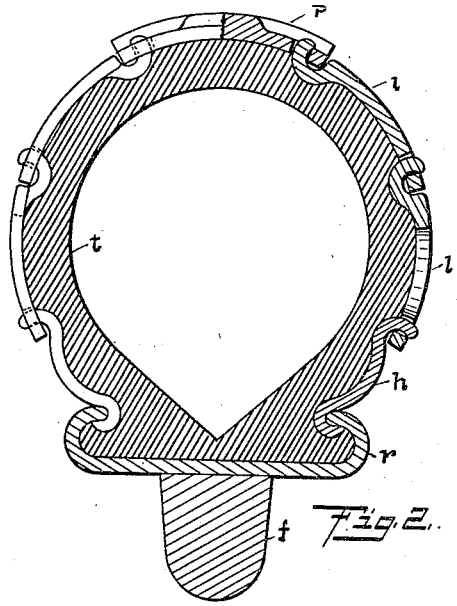
Fig. 2.
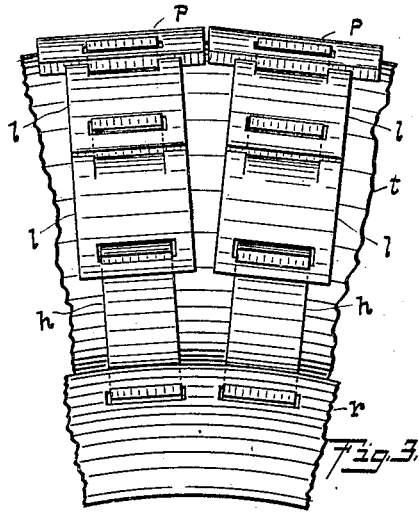
Fig. 3.
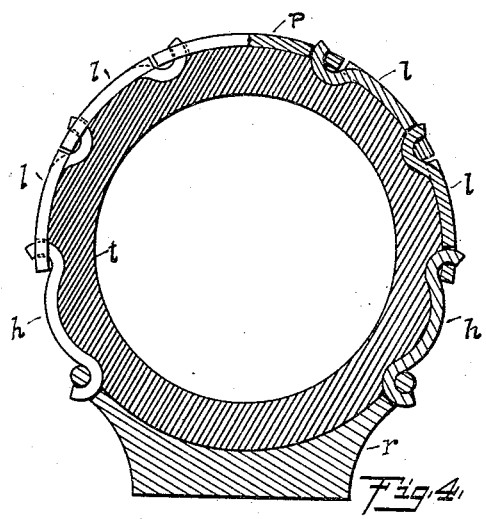
Fig. 4.
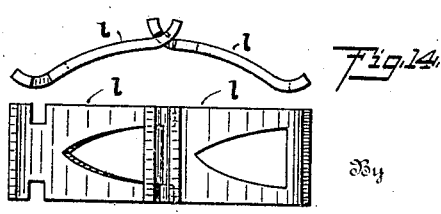
Fig. 14.
Fig. 15.
Witnesses
Curtis C Clifton
Ethel Huisler
Charles E. Kimball.
Inventor
By Clem. T. Kimball
Attorney No. 848,177. PATENTED MAR. 26, 1907.
C. E. KIMBALL.
TIRE PROTECTOR.
APPLICATION FILED NOV. 14, 1905.
2 SHEETS—SHEET 2.
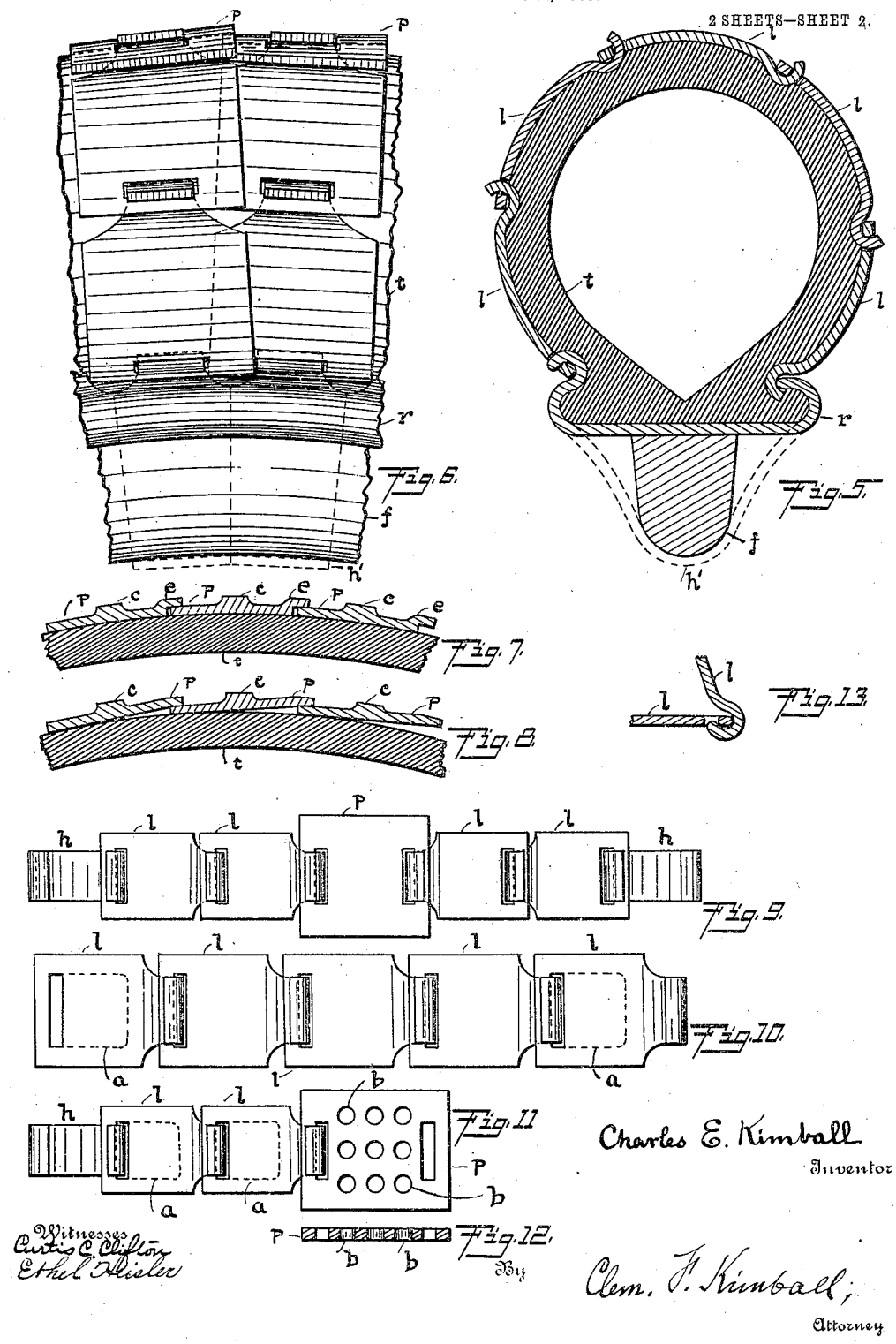

UNITED STATES PATENT OFFICE.

CHARLES E. KIMBALL, OF DUNNING, NEBRASKA.

TIRE-PROTECTOR.

No. 848,177.   Specification of Letters Patent.   Patented March 26, 1907.

Application filed November 14, 1905. Serial No. 287,339.

*To all whom it may concern:*

Be it known that I, CHARLES E. KIMBALL, a citizen of the United States, residing at Dunning, in the county of Blaine and State of Nebraska, have invented a new and useful Tire-Protector, of which the following is a specification.

My invention relates to improvement in tire-protectors for flexible or pneumatic tires in which one or more series of interlocking pieces are wrapped or placed transversely about the tire; and the objects of my invention are to provide a band or support to reinforce the tire, to provide a shield or armor to prevent wear, to provide a simple and effective shield against puncture or injury of flexible tires, to provide such a protector any part of which may be easily and quickly attached or removed, and to provide a means to prevent the wheels having flexible tires from slipping or skidding. I attain these objects by the following devices illustrated in the accompanying drawings, in which—

Figure 1 is a side elevation of a section of a pneumatic or cushion tire with rim or felly and overlapping plates and connections. Fig. 2 is a cross-section of said tire with rim or felly and end elevation and cross-section, respectively, of the connecting-pieces and overlapping plates. Fig. 3 is a side elevation of a section of a flexible tire of the single-tube variety with rim and connecting-pieces forming the protector. Fig. 4 is a cross-section of the elevation shown in Fig. 3, with elevation of one-half of the connecting-pieces about the tire. Fig. 5 is a cross-section of flexible tire and wheel-rim, showing protector formed of uniform interlocking plates. Fig. 6 is a side elevation of the parts of which the Fig. 5 is a cross-section. Figs. 7 and 8 are cross-sections of outer face of tire, showing forms of tread-plate. Figs. 9, 10, 11, and 15 are various forms of interlocking pieces forming connections and protector. Fig. 13 is a cross-section of a joint of said interlocking pieces. Fig. 12 is a cross-section of a perforated tread-plate. Fig. 14 is a side elevation of connecting parts shown in Fig. 15.

Similar letters refer to similar parts throughout the several figures.

$t$ is any flexible tire, either pneumatic, as represented in the drawing, or may be what is commonly known as a "cushion-tire," or tire of soft material and in any of the various forms of soft tires known to the art.

$r$ is a rim which is arranged to support the flexible tire, and $f$ is the felly, sometimes used with the rim $r$. In the art the felly $f$ and the rim $r$ are often one and the same piece; but this does not affect my invention.

A chain composed of interlocking or connecting pieces $p$, $l$, and $h$ is applied over and about the flexible tire $t$. The links or pieces of said chain may be made of any suitable dimensions to give the greatest possible flexibility to the tire-surface consistent with strength and practicability of manufacture. These chains composed of the connecting or interlocking pieces $p$, $l$, and $h$ may form a continuous band about the tire $t$ only or may form a continuous band about the tire $t$, rim $r$, and felly $f$ or may be attached at each end over the tire $t$ to the tire $t$, rim $r$, or felly $f$. These chain bands or series of connecting-pieces are all independent of each other and may be placed with their edges close together, or they may be arranged to overlap, as shown in Figs. 1, 6, 7, and 8. They may be arranged to hook into the rim $r$, as shown in Figs. 3 and 4, or under the rim $r$, as shown in Figs. 1, 2, and 5, or under the rim $r$ and by a hook upon the rim $r$, as shown in Figs. 5 and 6, and in the same manner onto the tire $t$ itself or to the felly $f$ by any suitable means. These chains $p$ $l$ $h$, &c., may be formed by a tread-plate $p$, having interlocking plates $l$ $l$, &c., with link $h$ engaging the rim $r$, or they may be made of pieces $p$ $l$ $l$, &c., each piece of the same size and shape. Metallic plates may be used in any of the forms described and may be overlapped, as shown in Fig. 1, Fig. 6, Fig. 7, and Fig. 8, or chains may be placed with the outer or tread plates $p$ $p$, &c., in juxtaposition, as shown in Fig. 3. These pieces $p$ $p$, &c., may also be formed, as shown at $a$ $a$, Fig. 11, of any convenient size and shape to support the material of the flexible tire. The tread-plates $p$ $p$, &c., and any number of other connecting-pieces $l$ $l$, &c., may consist of metallic interlocking plates placed upon the tire and connected, as heretofore described. Perforations $b$ $b$ may also be formed in the tread-plates $p$ $p$, &c., as shown in Fig. 11, and in these perforations may be placed cores of softer material, as lead, rubber, wood, or fiber, for the purpose of decreasing the noise of the tires as they strike the ground or pavement when upon the running wheel. There may also be placed upon the tread-plates $p$ $p$, &c., projections, as shown at $c$ $c$ &c., or the said pieces may be made with rough or corrugated surfaces, or the overlapping plates may be slightly raised, as shown at e e, &c., to prevent skidding or slipping of the wheels.

Each set of chains p p l l, &c., or series of connecting or interlocking pieces p p l h, &c., forming the band over the tire t, are placed in such juxtaposition as to prevent puncture between the pieces, but loosely enough to allow for the change of periphery of the tire-surface due to depression of the same when the loaded wheel is moved along its track. When the plates are constructed as in Fig. 9, the chains may be formed of three sets of pieces—the tread-plate p and connecting-links l l and connecting-links h—so that the whole tire casing or protector may be formed of three sets of pieces in numbers as required. When the plates are formed as shown in Fig. 10, they may be all made alike, and the whole casing may be formed of exactly similar pieces. The rim r in such case will be formed to engage the complementary ends of said pieces, as shown in Fig. 5.

The plates p l l h, &c., are formed to interlock or connect together in any convenient manner, but preferably by bringing them to some extraordinary position to which they will not be forced when upon the tire t, as shown in Figs. 13, 14, and 15, and forming chains, which are placed upon the tire by deflating it when a pneumatic tire is used or by pressing it into the soft material of a cushion or other flexible tire. These chains of connecting and interlocking pieces p l h, &c., are arranged to catch or fasten together, forming endless chains about the tire t, or to catch or fasten to the tire t, rim r, or felly f of the wheel. When it is desired to make said protector puncture-proof, the chains p l h, &c., may be placed closely together over the whole tread-surface of the tire t.

It is a well-known fact that all forms of flexible tires are subject to the greatest wear, danger of bursting, and injury at the lines on opposite sides of the tire where the compressed portion makes its most acute angle with the remaining portion of the tire. The greatest amount of wear is usually caused at the sides of the tire when thus pressed out by striking ruts and roughness of the track. By applying these chains at weak portions the tire is supported and protected from injury. The tread-plates p p of the chains, by which are meant the pieces covering the tread portion, may be arranged to overlap, as shown in Fig. 7, when it is desired to make the tire absolutely puncture-proof, sufficient looseness being left between their colliding edges to prevent the pieces on the periphery of the tire from buckling, and thus decreasing the elasticity and flexibility of the tire. By providing the necessary hooks or means of holding one end of the said chain to the rim r, felly f, or tire t and by catching the other end of the chains p l h, &c., into the rim r, felly f, or tire t of the wheel in any suitable manner the links may be all of the same size and shape, overlapping where necessary to cover the tire, as heretofore described. It has been found by practical use and demonstration that these bands or pieces can be placed upon the tire, as shown in Fig. 3, so closely together as to prevent puncture, but loosely enough apart to not affect to any extent the flexibility and resiliency of the tire. When it is desired to use this appliance to prevent skidding and slipping of the wheels and also to prevent puncture, the tread-plates p p, &c., may be corrugated or furnished with projections c c, &c., formed upon the piece itself. The plates p l h, &c., may be perforated, or some of them, as l l, may be perforated, as shown at a a or at b b, or the tread-plate p to prevent noise and to decrease skidding and slipping may be perforated. In these perforations for the same purposes may be inserted any suitable material, as rubber, lead, wood, or fiber, as shown in Figs. 11 and 12. While any suitable material may be used, metallic plates are found to be preferable and have greater value for some purposes of the invention, as to prevent puncture when pneumatic tires are used. When these chains are applied as described, they will follow the compression of the flexible tire and return to their original position by the elasticity of such tire. They will hold a pneumatic tire from bursting, and when applied to a cracked or broken tire will retain it in position much longer than it could otherwise be used. They will protect the side of the tire in ruts from being torn or lacerated and will prevent sharp obstacles from puncturing or cutting the softer material of the flexible tire. They will also permit a more general use of single-tube pneumatic tires and lighter casings for double tires.

I am aware that armor and shields for tires have been invented and used before, consisting of connected chains; but

What I claim, and desire to secure by Letters Patent, is—

1. The combination with a tire including a rim; of a series of tread-plates arranged upon the periphery of the tire, each tread-plate having oppositely-disposed slots formed in its body, the tread-plates being independent of one another, interlocking plates engaging the sides of the tire, one of each of the side plates having a tongue for interlocking engagement in the corresponding slot of the tread-plate, and the other plates having interlocking connection with each set of side plates and secured to the rim of the tire, the transversely-alining tread and interlocking plates having their body portions spaced from the bodies of the adjacent transversely-alining plates.

2. The combination with a tire including a rim; of a series of metallic tread-plates arranged upon the periphery of the tire, each tread-plate having oppositely-disposed slots formed in its body, the tread-plates being disconnected from one another, interlocking plates engaging the sides of the tire, one of each of said plates having a reduced end forming a tongue for interlocking engagement in the corresponding slot of the tread-plate and the other plates having interlocking connection with each set of side plates and secured to the rim of the tire, the transversely-alining tread and interlocking plates having their body portions spaced from the bodies of the transversely-alining plates.

3. The combination with a tire including a rim; of a series of overlapping tread-plates, each having oppositely-disposed slots and a raised portion intermediate the slots, side plates interlocking with each other and with the tread-plates, and other plates interlocking with the side plates and with the rim.

4. A tire-protector comprising a tread-plate provided with a slot at each end, a plate having a reduced end forming a tongue for engagement one in each slot of the tread-plate, the body portion of each of the second plates being out of contact with the tread-plate and each having a slot in it, and an element engaging the slot of each second plate and constructed to secure the tread and second plates upon the tire.

5. A tire-protector comprising a tread-plate provided with a slot at each end, a plate having a reduced end forming a tongue for engagement one with each slot of the tread-plate, the body portion of each of the second plates being out of contact with the tread-plate and each having a slot in it, a third plate having a reduced end forming a tongue for engagement one in each slot of the second plate, the body portion of each of the third plates being out of contact with the body of the second plates, each third plate having a slot in it, and an element engaging the slot of the third plate and constructed to secure all the plates upon the tire.

CHARLES E. KIMBALL.

Witnesses:
ETHEL HEISLER,
CLEM. F. KIMBALL.